June 23, 1925.  
P. B. CAMP ET AL  
BRAKE MECHANISM  
Filed Nov. 17, 1924  
1,543,470

Inventors:  
Percy B. Camp  
Herbert E. Bartsch  
By Gillson Mann & Cox  
Attys.

Patented June 23, 1925.

1,543,470

UNITED STATES PATENT OFFICE.

PERCY B. CAMP, OF MAYWOOD, AND HERBERT E. BARTSCH, OF CHICAGO, ILLINOIS, ASSIGNORS TO UNIVERSAL DRAFT GEAR ATTACHMENT CO., A CORPORATION OF ILLINOIS.

BRAKE MECHANISM.

Application filed November 17, 1924. Serial No. 750,254.

*To all whom it may concern:*

Be it known that we, PERCY B. CAMP and HERBERT E. BARTSCH, citizens of the United States, and residents of Maywood, county of Cook, and State of Illinois, and Chicago, county of Cook, and State of Illinois, respectively, have invented certain new and useful Improvements in Brake Mechanism, of which the following is a specification, and which are illustrated in the accompanying drawings, forming a part thereof.

This invention relates to brake mechanism for railway cars and the like.

The principal object of the invention is the provision of new and improved means for interlocking the operating chain with the power transmitting cam or lever with which the chain is associated.

Another object of the invention is the provision of a power transmitting cam or lever for railway brake mechanism that is provided with new and improved means for attaching the brake operating chain thereto.

Other objects of the invention are the provision of new and improved means for connecting the operating chain to the power transmitting cam or lever that is simple in construction, cheap to manufacture, and to which the brake operating chain may be easily and quickly applied or adjusted thereon.

Other and further objects and advantages of the invention will appear from the following description taken in connection with the accompanying drawings, in which—

Figure 1:
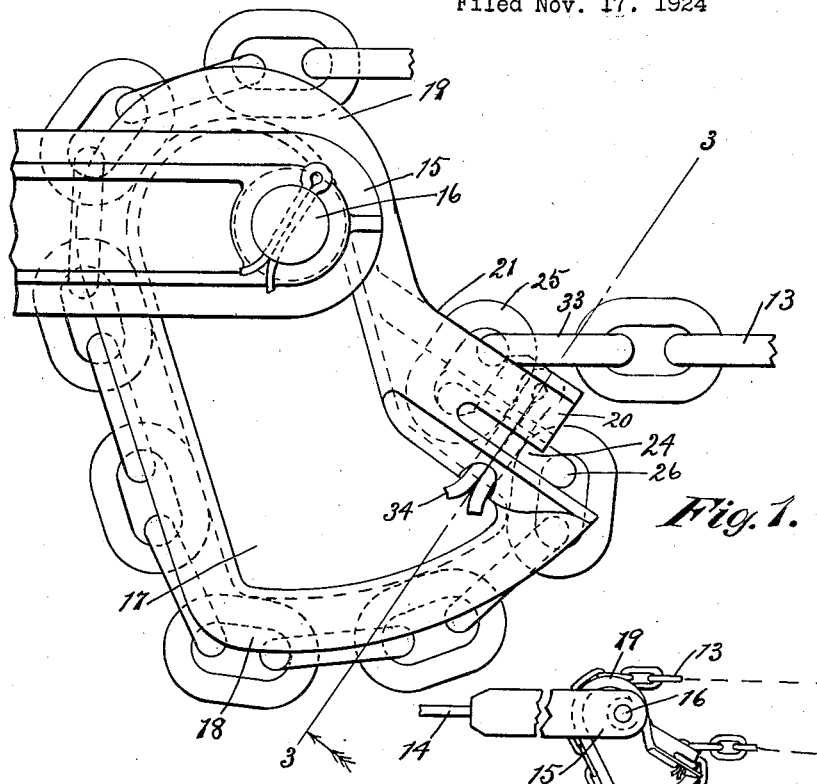
Fig. 1 is a side elevation of a reversible brake lever provided with novel means for attaching the chain thereto.
Figure 4:
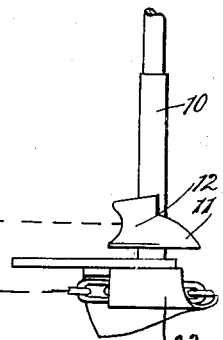
Fig. 4 is a side elevation of a portion of a brake mechanism, showing the parts in brake releasing position.
Figure 5:
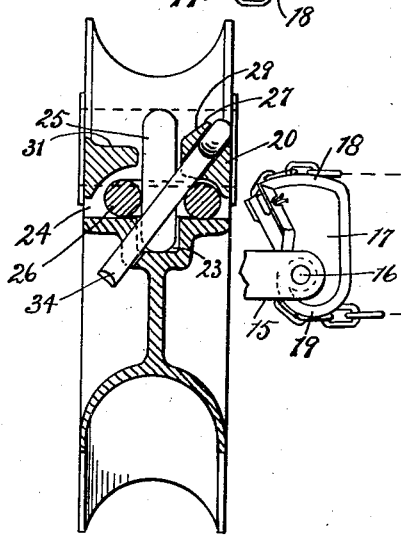
Fig. 5 is a similar view showing the parts in position for applying the brakes.
Figures 2, 3:
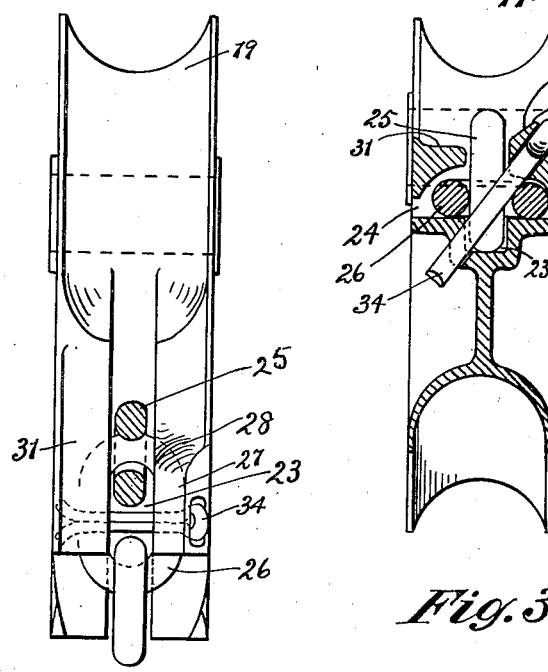
Fig. 2 is an elevation of the reversible lever at right angles to that shown in Fig. 1, with parts in section.
Fig. 3 is a section on line 3—3 of Fig. 1.

On the drawings, the reference character 10 designates a brake staff on which is mounted a brake drum 11 provided with a spiral groove 12 for guiding the brake chain 13 upwardly along the brake staff. At 14 is shown a portion of a brake operating rod which is adapted to be attached to the brake lever. The rod 14 terminates in a clevis or fork 15 provided with a pivot bolt 16 on which is journaled a reversible power transmitting cam or lever 17.

The cam or lever 17 is pivoted with a long and a short arm 18 and 19 respectively. The short arm is curved and the pivot is eccentric to the curve. The long arm is in the form of a segment the periphery of which terminates abruptly as at 21, which for convenience will be termed the rear of the segment. The front edge of the segment is comparatively straight. The periphery of the ends and the front edge of the reversible lever 17 are provided with a groove about which is trained the chain 13. The chain 13 is connected to the drum 11, extends about the reversible lever 17 and has its opposite end connected to the anchor member 22.

Suitable means is provided for securing the chain to the cam or lever 17. It has been the common practice heretofore in constructions of this type to secure the chain to the cam or lever by means of U-bolts, hooks or hook bolts, but in such constructions the hook bolts become loose or broken by the excessive wear to which they are subjected, or the chain becomes loosened from the hooks in one way or another. It is desirable, therefore, that the attaching means be integral with the lever, and so arranged that the chain cannot become disengaged therefrom under any condition of service.

It is necessary, in the initial operation of the brake mechanism, that the end of the chain adjacent to the brake staff engage the largest portion of the drum 11 and the short arm of the lever, and, during the final movement after the lever has reversed, that it engage the long arm of the lever, whereby, during the initial movement of the brake shaft, the slack in the mechanism may be taken up rapidly and in the final movement the lever will afford a very great mechanical advantage in applying the brake. In order to accomplish this result, it is necessary to provide means whereby the lever may be adjusted relatively to the chain. Suitable mechanism has been provided for this purpose, and the same will now be described.

The rear edge or face 21 of the lever 17 is provided with a projection 20, which has a slot 23 in the plane of said lever, and with an intersecting slot 24 extending in the same direction as said slot 23, and at an angle thereto.

The slots 23 and 24 are both open at their forward ends, and the slot 23 is adapted to receive a link, as 25, of the chain 13. The slot 24 is adapted to receive an adjacent link, as 26, of said chain. The projection 20 is provided at one side of the slot 23 with an extension 27 forming a shoulder 28 at its inner end. The projection 20 has a face 29, which forms, with the opposite face or surface 31 of the extension 27, a groove along which the inner end of the link 33 is adapted to travel when the chain is released from the position shown in Fig 1.

The parts are so arranged that when the chain is in the position shown on the drawing it is interlocked with the lever extension, and the chain held in position by the shoulder 28 engaging the link 33. When it is desired to remove the chain from the attaching means of the lever the link 33 is moved to a position in which its axis is at right angles to the faces 29 and 31, after which the chain may be moved outwardly to disengage the links 26 and 25 from the slots 24 and 23, respectively.

In order to prevent accidental disengagement of the chain from the holding means, a bolt or pin 34 is provided which extends through suitable openings in the holding means, and through the link 26. The outer end of the opening is enlarged to receive the head of the pin, whereby the same will not engage the fork of the brake rod when the lever 17 rotates therein.

It will be understood that various changes may be resorted to in the form, size, construction, composition and arrangement of the several parts, without departing from the spirit and scope of our invention; hence we do not wish to limit ourselves strictly to the structure herein set forth.

We claim as our invention—

1. In a brake mechanism, a reversible lever having a pivot adjacent one end thereof for forming said lever into a long and a short arm, both arms of said lever being provided with a groove, an operating chain extending about both ends of said lever, and means integral with said lever for adjustably connecting said chain to said lever.

2. In a brake mechanism, a rotating cam-shaped lever having a groove on its periphery for receiving an operating chain, and means associated with said groove and integral with said lever for engaging said chain exteriorly of the openings in the links thereof for attaching the chain to said lever.

3. In combination, a brake rod, a lever pivoted to said rod, said lever being provided with a groove, a brake staff, a conical drum on said staff, an anchor, a chain having one end secured to said anchor, engaging the groove in said lever and having its other end secured to said drum, and means integral with said lever for adjustably engaging said chain.

4. In a brake mechanism, a reversible lever having a pivot forming said lever into a long and a short arm, and a projection on one edge face of said lever, said projection having open slots arranged at an angle to each other for detachably engaging adjacent links of a brake chain.

5. In a brake mechanism, a reversible lever having a pivot forming said lever into a long and a short arm, a chain trained about said lever, a projection on one edge face of said lever, said projection being provided with open slots arranged at an angle to each other for detachably engaging adjacent links of said chain, and means integral with said lever for preventing disengagement of said links during the normal operation of said mechanism.

6. In a brake mechanism, a reversible lever having a pivot forming said lever into a long and a short arm, a chain trained about said lever, a projection on one edge face of said lever, said projection being provided with open slots arranged at an angle to each other for detachably engaging adjacent links of said chain, and means integral with said lever for preventing disengagement of said links when one of same has been moved to a predetermined position relatively to said slots.

7. In a brake mechanism, a reversible lever having a pivot forming said lever into a long and a short arm, a chain trained about said lever, a projection on one edge face of said lever, said projection being provided with open slots arranged at an angle to each other for detachably engaging adjacent links of said chain, and a shoulder on said projection for preventing the accidental disengagement of said links.

In testimony whereof we affix our signatures.

PERCY B. CAMP.
HERBERT E. BARTSCH.